(12) United States Patent
Richter

(10) Patent No.: US 7,251,324 B2
(45) Date of Patent: Jul. 31, 2007

(54) HOLDER FOR MINICOMPUTERS OR SIMILAR APPARATUS

(76) Inventor: Harald Richter, Höhenstrasse 22, 75331 Höhenbrand (DE)

( * ) Notice: Subject to any disclaimer, the term of this patent is extended or adjusted under 35 U.S.C. 154(b) by 235 days.

(21) Appl. No.: 11/098,182

(22) Filed: Apr. 4, 2005

(65) Prior Publication Data

US 2006/0027724 A1    Feb. 9, 2006

(30) Foreign Application Priority Data

Apr. 3, 2004    (DE) .................. 10 2004 016 558

(51) Int. Cl.
*H04M 1/00*    (2006.01)

(52) U.S. Cl. .............. 379/454; 379/446; 248/309.1; 248/313

(58) Field of Classification Search ............ 248/309.1, 248/316.4; 379/454, 446, 455, 426; 224/273, 224/281

See application file for complete search history.

(56) References Cited

U.S. PATENT DOCUMENTS

| 5,187,744 | A | * | 2/1993 | Richter | ........................ 379/449 |
| 5,305,381 | A | * | 4/1994 | Wang et al. | ................. 379/455 |
| 5,457,745 | A | * | 10/1995 | Wang | ........................ 379/454 |
| 5,961,016 | A | * | 10/1999 | Hartmann et al. | ........... 224/571 |
| 6,062,518 | A | * | 5/2000 | Etue | ........................ 248/231.21 |
| 6,366,672 | B1 | * | 4/2002 | Tsay | ........................ 379/446 |
| 6,816,713 | B2 | * | 11/2004 | Chen | ........................ 455/90.3 |

* cited by examiner

*Primary Examiner*—Amy J. Sterling
(74) *Attorney, Agent, or Firm*—Klaus J. Bach

(57) ABSTRACT

In a holder for minicomputers or similar apparatus, including a planar body, which is inclined in a normal operating position, and clamping jaws arranged at opposite sides for engaging therebetween an apparatus placed onto the planar body, the planar body has at least at one end thereof a guide groove with stop fingers slidably supported in the guide groove so as to extend therefrom upwardly above the surface of the planar body to prevent any apparatus from sliding off the planar body, the stop fingers being position adjustable along the guide slot for accommodating plug or connections provided at the bottom end of the apparatus.

3 Claims, 1 Drawing Sheet

HOLDER FOR MINICOMPUTERS OR SIMILAR APPARATUS

BACKGROUND OF THE INVENTION

The invention relates to a holder for minicomputers and similar apparatus, such as Personal Digital Assistants (PDA's) or cellular telephones. Such minicomputers, which are often used as organizers, telephone directories and other organizational aids, may also be used as GPS navigation systems. For supporting such devices in a car or on a desk, device holders (PDA holders) are provided which are designed in such a way that the minicomputer can be simply deposited on such a holder and also easily be retrieved while remaining readily accessible when deposited on the holder. The device holders are often supported by a so-called goose neck that is an arm which is mounted on a console for mounting in a car or attachment to a desk and which is bendable so that the device holder can be arranged in a position convenient for the user of the device. The holder comprises a plate structure on which the minicomputer is supported and two opposite side clamping jaws, whose distance is adjustable and which are provided with some padding for engaging the device.

However, since the device holder is disposed often in a steeply inclined position as convenient for the user, the plate structure is provided at the bottom end thereof with two fingers which form a stop for the device to prevent its sliding out of the holder when the holder is in such a steeply inclined position.

Since the devices of various manufacturers have the plugs and cable connections at the lower edge of such devices at different and differently spaced locations, each type of device generally requires a special holder where the stop fingers are arranged so that the plugs and cable connections of the particular device are accommodated, that is, they must be arranged at locations where they do not interfere with the plugs or cable connections. Holders can therefore not be used universally for any type of device. A universal use is also impossible because some minicomputers include also operating elements at the sides thereof so that the clamping jaws must be provided at locations where they don't interfere with operating elements at the sides of the device.

It is the object of the present invention to provide a device or apparatus holder which is adaptable to various devices or types of minicomputers or similar apparatus so that it can be used universally.

SUMMARY OF THE INVENTION

In a holder for minicomputers or similar apparatus, including a planar body, which is inclined in a normal operating position, and clamping jaws arranged at opposite sides for engaging therebetween an apparatus placed onto the planar body, the planar body has at least at one end thereof a guide groove with stop fingers slidably supported in the guide groove so as to extend therefrom upwardly above the surface of the planar body to prevent any apparatus from sliding off the planar body, the stop fingers being position adjustable along the guide slot for accommodating plug or connections provided at the bottom end of the apparatus.

With the arrangement of the finger stops such that they can be individually moved along the lower end of the holder and consequently adjusted to clear any plugs or cable connections of a particular device supported on the holder, the holder can be used for supporting most any type of device on the market.

In a particular embodiment of the invention also the clamping jaws may be adjustable or provided with adjustable members such that side operating elements of devices supported on the holder can be accommodated.

In a particularly advantageous arrangement, the side clamping jaws are not arranged centrally but off center and the means for supporting the finger stops are provided at both ends of the holder so that the finger stops can be mounted at either end of the holder and, depending on which end of the holder is used as the bottom part, the side clamping jaws are arranged at different distances from the finger stops.

The invention will become more readily apparent from the following description thereof on the basis of the accompanying drawings:

DESCRIPTION OF A PREFERRED EMBODIMENT

The figures show the arrangement according to the invention schematically while omitting extraneous features. The device or apparatus holder shown in the figures comprises a planar body 1 having a surface for supporting the apparatus. In a position, as generally used, the holder is inclined. At opposite sides of the planar body 1, there are clamping jaws 2 which are movable relative to each other for holding therebetween the apparatus or device and at the narrow lower end of the planar body 1 two stop fingers 3 are provided for holding a device or apparatus on the planar body 1.

The planar body 1 is in the form of a flat box, in which an operating and tensioning mechanism for the clamping jaws 2 is contained. The bottom side of the planar body 1 is provided for example with a slot arrangement (see, for example U.S. Pat. Nos. 5,740,995; 6,749,160) for releasably mounting the planar body 1 onto the head of a support arm).

Figure 3:
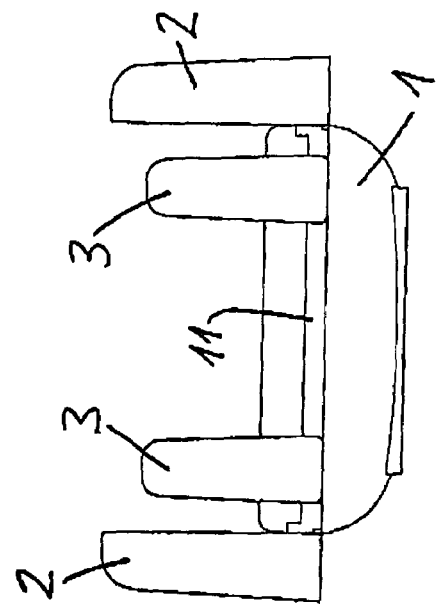
FIG. 3 is a front view of the device holder.
Figure 2:
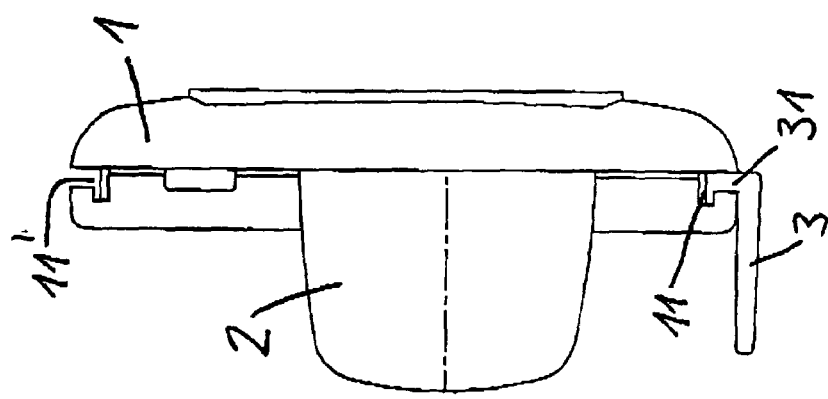
FIG. 2 is a side view of the device holder.
Figure 1:
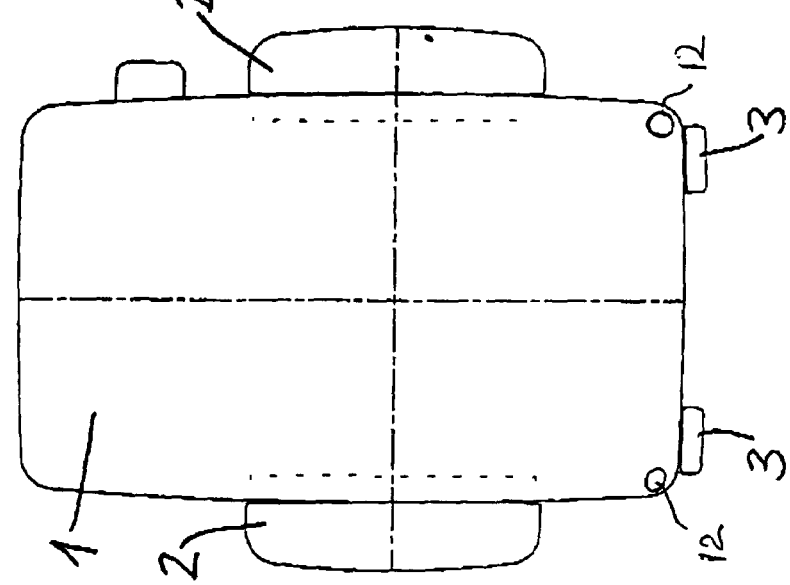
FIG. 1 is a top view of the device holder according to the invention.

The two opposite clamping jaws 2 are movable relative to each other between an outward end position (not shown) in which they are moved fully apart and a clamping position in which they engage therebetween a device placed onto the planar plate. As shown in FIGS. 1 and 2, the clamping jaws are arranged off-center in the longitudinal direction of the planar body 1.

The stop fingers 3 are not rigidly mounted to the planar body 1, but are separate parts. They are supported at one longitudinal end of the planar body 1, that is the lower end thereof with their feet 31 received in a slide groove 11 of the plate body 1 so that they are slidably supported and can be independently positioned in any desirable spaced relationship to in a position in which any plugs or connectors inserted into a device disposed on the planar body 1 can be accommodated.

Such a slide groove 11 is provided at each longitudinal end of the plate body 1 and each slide groove is open at least at one end thereof so that the stop fingers can be removed from one of the slide grooves 11 and inserted into the slide groove 11' at the opposite end of the plate body 1, depending on any operating elements arranged on the side of a device or apparatus being supported. Since the clamping jaws are arranged off-center, they are arranged either closer to the lower or the upper end of the planar body 1 depending on how the planar body 1 is supported and the stop fingers are inserted so that they are disposed at the lower end to prevent the device or apparatus from sliding off the planar body 1. Simply by turning the planar body 1 by 180°, the position of the clamping jaws can be changed.

The provision of slide grooves 11, 11' at opposite ends of the planar body 1 as shown in the figures and described above is advantageous if the clamping jaws are disposed off center. The same is true also for clamping jaws which are provided with windows, which are not symmetrically arranged with respect to the planar body 1 that is, in short, whenever turning of the planar body by 180° provides a different situation for the device or apparatus supported on the planar body 1.

Of course, at the ends of the guide slots 11 removable stops 12 may be provided such as screws or clips which must be removed or released to facilitate the removal of the stop fingers 3 from a particular guide groove 11, 11". However, if the stop fingers 3 are engaged in the grooves 11, 11' with a sufficiently large slide resistance such stops are frictionally held in place and removable stops are not needed since the stop fingers 3 cannot be moved unless they are moved forcefully by a user.

What is claimed is:

1. A holder for minicomputers or similar apparatus with an elongated planar body (1) which is inclined in a normal operating position and forms a support surface having a first end and an opposite second end, clamping jaws (2) arranged at opposite sides of the planar body (1) for engaging therebetween an apparatus placed onto the planar body (1), said planar body having at the first end thereof a first transverse guide groove (11), and stop fingers (3) having each a foot part (31) independently slidably received in the first transverse guide groove (11) so as to be movable to any position along the first transverse guide groove 11 and extending upwardly from the planar body (1) so as to prevent any apparatus placed on the planar body (1) from sliding off the planar body (1), and releasable stops (12) provided at the ends of the first transverse guide groove (11) for preventing unintended release of the stop fingers (3) from the first transverse guide groove (11).

2. A holder according to claim 1, wherein the clamping jaws are arranged off-center with respect to a longitudinal extension of the planar body (1).

3. A holder according to claim 1, wherein a second transverse guide groove (11') is provided in the planar body (1) at the end thereof opposite the first transverse guide groove (11) for slidably receiving said stop fingers (3).

* * * * *